United States Patent [19]

Sakai et al.

[11] Patent Number: 4,688,451
[45] Date of Patent: Aug. 25, 1987

[54] TRANSMISSION CONTROL SYSTEM WITH SEPARATE SHIFT TIMING CONTROL PRESSURE SUPPLY PASSAGE

[75] Inventors: Takahiro Sakai; Isamu Minemoto, both of Toyota, Japan

[73] Assignee: Toyota Jidosha Kabushiki Kaisha, Toyota, Japan

[21] Appl. No.: 874,828

[22] Filed: Jun. 16, 1986

Related U.S. Application Data

[63] Continuation of Ser. No. 596,684, Apr. 4, 1984, abandoned.

[30] Foreign Application Priority Data

May 24, 1983 [JP] Japan .................. 58-092097
Aug. 9, 1983 [JP] Japan .................. 58-145471

[51] Int. Cl.$^4$ ............................ B60K 41/06
[52] U.S. Cl. ........................ 74/867; 74/868
[58] Field of Search ............ 74/865, 867, 868, 861; 192/761, 3.61, 0.082, 0.094

[56] References Cited

U.S. PATENT DOCUMENTS

| | | | |
|---|---|---|---|
| 3,365,985 | 1/1968 | Johnson | 74/785 X |
| 3,500,706 | 3/1970 | Oberpichler | 74/868 |
| 3,554,057 | 1/1971 | Michnay et al. | 74/761 X |
| 3,842,693 | 10/1974 | Oberpichler | 74/868 X |
| 4,274,307 | 6/1981 | Iwanaga et al. | 74/868 X |
| 4,291,596 | 9/1981 | Sakakibara | 74/867 |
| 4,308,765 | 1/1982 | Iwanaga et al. | 74/868 X |
| 4,313,354 | 2/1982 | Iwanaga et al. | 74/868 X |
| 4,334,441 | 6/1982 | Iwanaga et al. | 74/868 |
| 4,462,278 | 7/1984 | Murakami et al. | 74/868 |
| 4,501,173 | 2/1985 | Honig | 74/867 X |

FOREIGN PATENT DOCUMENTS

| | | | |
|---|---|---|---|
| 55-24221 | 2/1980 | Japan | 74/867 |
| 55-86945 | 7/1980 | Japan | 74/867 |
| 55-86946 | 7/1980 | Japan | 74/867 |

Primary Examiner—Joseph M. Rolnicki
Attorney, Agent, or Firm—Oblon, Fisher, Spivak, McClelland & Maier

[57] ABSTRACT

In an upshift timing system which provides a drain passage at higher flow resistance for a first friction engaging device to be disengaged when a hydraulic fluid pressure of a second friction engaging device to be engaged supplied as an actuating pressure to a control port of an upshift timing control valve is less than a certain value and at lower flow resistance when the actuating pressure is greater than the certain value, the control port is supplied with the actuating pressure directly from a pressure chamber of the second friction engaging device via a passage which is separate from a passage which supplies actuating pressure from a pressure source to the pressure chamber of the second friction engaging device.

6 Claims, 7 Drawing Figures

TRANSMISSION CONTROL SYSTEM WITH SEPARATE SHIFT TIMING CONTROL PRESSURE SUPPLY PASSAGE

This application is a continuation of application Ser. No. 596,684, filed Apr. 4, 1984, abandoned.

BACKGROUND OF THE INVENTION

The present invention relates to a hydraulic fluid pressure control system, included in an automatic transmission, for controlling the shifting operation of a gear transmission mechanism which includes a plurality of friction engaging devices, and more particularly relates to such a hydraulic fluid pressure control system, in which a shift timing control subsystem is provided for ensuring good control of the timing of shifting between two adjacent speed stages of the gear transmission mechanism, each of said two speed stages being provided by engagement of a particular friction engaging device corresponding thereto.

Various different types of gear transmission mechanism are used in automatic transmissions. In these gear transmission mechanisms typically each of the speed stages is provided by supplying actuating hydraulic fluid pressure to a particular hydraulic pressure actuated friction engaging device such as a hydraulic clutch or brake, and shifting between two speed stages is performed in such a manner that a certain first friction engaging device which has been engaged by supply of a hydraulic fluid pressure thereto to provide e.g. a lower speed stage is disengaged by exhausting of the hydraulic fluid pressure therefrom, while a certain second friction engaging device which has been disengaged is engaged to provide a higher speed stage by supply of a hydraulic fluid pressure thereto.

For the shifting of a gear transmission mechanism between two speed stages, various hydraulic fluid pressure control systems have been proposed in the prior art. Typically, such a hydraulic pressure control system includes a lower/higher speed stage shift valve having a valve element, which is moved axially to and fro by the balance between a throttle hydraulic fluid pressure proportional to the amount of accelerator pedal depression, and a governor hydraulic fluid pressure proportional to the current road speed of the vehicle, so as to connect a pressure chamber of a first friction engaging device to a line pressure source while connecting a pressure chamber of a second friction engaging device to a drain passage when its valve element is shifted to one axial position by the throttle pressure prevailing over the governor pressure, whereas, on the other hand, when the valve element is shifted to another axial position by the governor pressure prevailing over the throttle pressure, so as to connect the pressure chamber of the first friction engaging device to a drain passage while connecting the pressure chamber of the second friction engaging device to the line pressure source.

In order to control a proper timing of the engagement and disengagement and disengagement of the first and the second friction engaging devices, such a speed stage shifting system is generally accompanied by a shift timing control subsystem, such as an upshift timing control subsystem, which controls the timing of the disengagement of the first friction engaging devices in relation to the engagement of the second friction engaging device during the upshift transmission. Such a shift timing control subsystem operates by regulating the flow resistance of the passage by which the actuating pressure chamber of the friction engaging device to be disengaged is drained. The shift timing control subsystem includes a variable throttling means located at an intermediate point along the drain passage for the pressure chamber of the first friction engaging device, and is responsive to the pressure magnitude of the fluid pressure supplied to the pressure chamber of the second friction engaging device, and, during the first part of this shifting process, when the pressure value in said second friction engaging device pressure chamber is below a certain threshold value at which substantial torque transmission between the friction engaging members of said second friction engaging device occurs, causes said drain passage for the pressure chamber of the first friction engaging device to have a relatively high flow resistance, so that during this first stage of engagement of the second friction engaging device the first friction engaging device is being relatively slowly disengaged, since the pressure in the pressure chamber thereof is only being vented relatively slowly past said relatively high resistance presented by said shift timing control subsystem. On the other hand, when the pressure value in said second friction engaging device pressure chamber rises to become above said threshold value, so that now definitely substantial torque transmission between the friction engaging members of said second friction engaging device is occurring, then the shift timing control subsystem causes said drain passage for the pressure chamber of the first friction engaging device to have a relatively low flow resistance, so that thereafter during the latter stage of engagement of the second friction engaging device the first friction engaging device is being relatively quickly disengaged, since the pressure in the pressure chamber thereof is now being relatively quickly vented past said relatively low resistance now being presented by said shift timing control subsystem. Typically, such a shift timing control subsystem comprises a shift timing valve, through which the pressure chamber of the first friction engaging device is drained to one or another drain port with various throttling devices being provided en route, or the like, and to which the actuating pressure for the pressure chamber of the second friction engaging device is supplied as a control pressure for moving the valve element thereof. This type of shift timing control subsystem is per se well known in the transmission art.

However, a problem which has arisen with such prior art transmission control systems is that, since typically the control port of the shift timing valve is supplied with the actuating hydraulic fluid pressure which is being supplied to the second friction engaging device from an intermediate supply point in the hydraulic fluid conduit which leads from the lower/higher shift valve to said second friction engaging device, and in fact possibly via a short branch conduit, the hydraulic fluid pressure supplied to said control port of the shift timing valve becomes undesirably higher than the designed due value, because of an increase of viscosity of the hydraulic fluid of the transmission when the hydraulic fluid in the transmission is cold as when the transmission has not yet fully been warmed up from the cold condition. This means that, in the cold state operation, the first friction engaging device will be disengaged too soon before the second friction engaging device is properly engaged, and this can lead to slipping of the transmission, and racing of the engine.

On the other hand, it is also important that the timing of the releasing of the first friction engaging device is not too much delayed, in relation to the engagement of the second friction engaging device, as such delayed disengagement of the first friction engaging device can lead to both the first friction engaging device and the second friction engaging device being to a large extent engaged at one and the same time, which can cause severe frictional wearing of the first and the second friction engaging devices. Further, it is necessary to be aware of the problem that often air bubbles or the like tend to become trapped into the transmission hydraulic fluid conduits at various points, and such trapped air should not be allowed seriously to deteriorate the operation of the transmission.

SUMMARY OF THE INVENTION

Accordingly, it is the primary object of the present invention to provide an automatic transmission hydraulic pressure control system, which can provide proper timing of the engagement and disengagement of first and second friction engaging devices in such a gear transmission mechanism to which such a switchover shifting procedure is applicable.

It is a further object of the present invention to provide such an automatic transmission hydraulic pressure control system, which preserves its good operation, even when the hydraulic fluid in the transmission is cold.

It is a yet further object of the present invention to provide such a hydraulic pressure control system, which functions properly, even when air bubbles of the like are trapped in conduits thereof.

According to the most general aspect of the present invention, these and other objects are accomplished by, in an automatic transmission, for a gear transmission mechanism comprising first and second hydraulic pressure actuated friction engaging devices which comprise respective first and second pressure chambers, said gear transmission mechanism providing a certain lower speed stage when said first friction engaging device is engaged by supply of actuating hydraulic fluid pressure to said first pressure chamber and said second friction engaging device is disengaged by non-supply of actuating hydraulic fluid pressure to said second pressure chamber, and a certain higher speed stage one speed stage above said certain lower speed stage when said first friction engaging device is disengaged by non-supply of actuating hydraulic fluid pressure to said first pressure chamber and said second friction engaging device is engaged by supply of actuating hydraulic fluid pressure to said pressure chamber: a hydraulic fluid pressure control system, comprising: (a) an upshift timing control means comprising a valve element, a control port a pressure supplied to which controls shifting of said valve element, and a control passage flow resistance of which changes according to the shifting of said valve element, said control passage providing a relatively high flow resistance when the pressure supplied to said control port is less than a certain value and a relatively low flow resistance when the pressure supplied to said control port is greater than said certain value; (b) a source of line hydraulic fluid pressure; (c) a first hydraulic fluid conduit system; (d) a second hydraulic fluid conduit system, substantially separate from said first hydraulic fluid conduit system, communicating said second pressure chamber of said second friction engaging device to said control port of said upshift timing control means; and (e) a shift valve which is selectively positioned either to: (e1) a first position, in which it connects said source of line hydraulic fluid pressure to said first pressure chamber of said first friction engaging device, and in which it connects said second pressure chamber of said second friction engaging device to a drain via said first hydraulic fluid conduit system; or to: (e2) a second position, in which it connects said source of line hydraulic fluid pressure to said second pressure chamber of said second friction engaging device via said first hydraulic fluid conduit system, and in which it connects said first pressure chamber of said first friction engaging device to a drain via said control passage of said upshift timing control means.

According to such a structure, upon upshifting, when the shift valve shifts from said first position to said second position, and the second pressure chamber of the second friction engaging device starts to be supplied with hydraulic fluid through said first hydraulic fluid conduit system at a certain rate of flow, then the draining of hydraulic fluid from said first pressure chamber of said first friction engaging device through said upshift timing control means takes place first at a relatively slow rate defined by the relatively high flow resistance of said upshift timing control means at this time, due to the relatively low value of the pressure in the second pressure chamber of the second friction engaging device which is being transmitted through the second hydraulic fluid conduit system to the control port of said upshift timing control means. On the other hand, after the pressure from said second pressure chamber of the second friction engaging device transmitted through the second hydraulic fluid conduit system to the control port of said upshift timing control means becomes higher than said certain value, then the draining of hydraulic fluid from said first pressure chamber of said first friction engaging device through said upshift timing control means takes place subsequently at a relatively high rate defined by the relatively low flow resistance of said upshift timing control means at this time. During this process, it is always definitely ensured that the pressure at said control port of said upshift timing control means cannot ever be higher than the actual pressure in said second pressure chamber of said second friction engaging device, due to the provision of said second hydraulic fluid conduit system from said second pressure chamber of said second friction engaging device as being substantially separate from said first hydraulic fluid conduit system, regardless how cold and accordingly how viscous the hydraulic fluid in the transmission is; and accordingly no risk ever arises of the flow resistance of said upshift timing control means dropping to its relatively low value too soon. Therefore, it is positively avoided that the first friction engaging device should become disengaged too soon in relation to the engagement of the second friction engaging device, because of high flow resistance in the conduits of the transmission caused by the fluid therein being cold; and accordingly slipping of the transmission, loss of engine braking and racing of the engine of the vehicle and possible consequent damage thereto, clonking of the transmission during shifting, and production of harmful emissions in the exhaust gases of the engine, are all avoided; and further damage to the second friction engaging device of the transmission by its relatively rotating members being caused to become engaged together while rotating at too high a relative rotational speed during such engine racing is positively avoided. Thus, this structure ensures that the operation of the upshift timing control means is always accurate, which means that the upshifting is achieved with a proper timing, even when the hydraulic fluid in the transmission is cold and viscous.

BRIEF DESCRIPTION OF THE DRAWINGS

The present invention will now be described with reference to the preferred embodiments thereof, and with reference to the appended drawings. It should be understood, however, that the scope of the present invention is not to be considered as limited by any of the features of the shown embodiments, or of the drawings, which are given for the purposes of illustration and exemplification only, but is to be defined solely by the accompanying claims. In the drawings:

DESCRIPTION OF THE PREFERRED EMBODIMENTS

Figure 1:
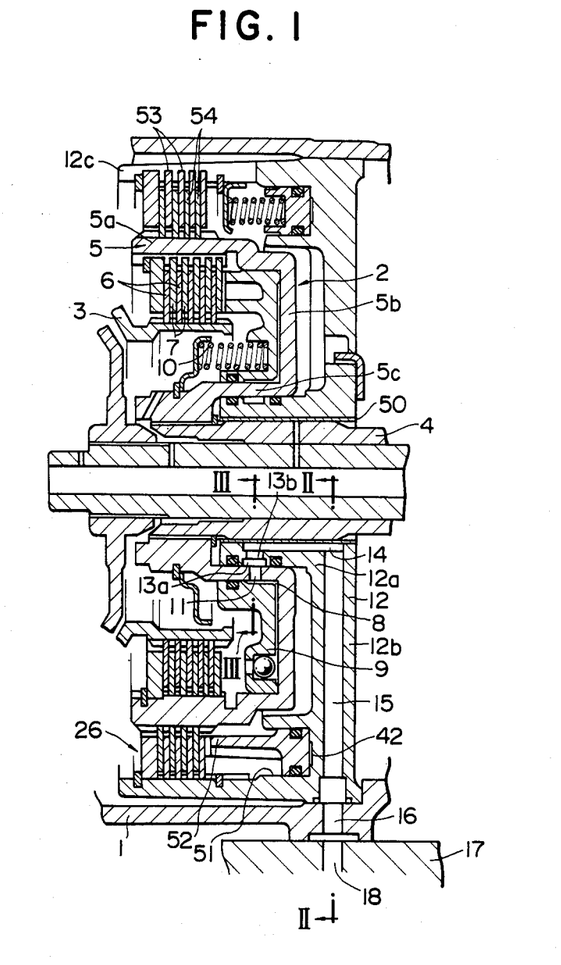
FIG. 1 is sectional view of a part of an automatic transmission, including a second speed brake and a third speed clutch the engagement and disengagement of which are changed over for speed shifting between the second and the third speed stage, taken in a longitudinal plane which includes the central axes of power input and output members of said friction engaging device.

In FIG. 1 there is shown a longitudinal sectional view of a part of a gear transmission mechanism of an automatic transmission, including a second brake and a direct clutch which are alternatively engaged when the second or third speed stage of the transmission is to be engaged. In FIG. 1, reference numeral 1 denotes the transmission casing of said automatic transmission. The direct clutch designated by reference numeral 2 has a power input member 3 which is rotationally powered by spline engagement from a power input shaft not shown in the drawings, and further has a power output member 5, which is rotationally connected to an intermediate shaft 4 which serves as a power output member of the clutch 2, and which is formed with a flat annular shaped portion 5b, an outer cylindrical portion 5a, and an inner cylindrical portion 5c. A center support member 12 is securely fixed in the transmission casing 1, and has a hub portion 12a which rotatably supports the intermediate shaft 4 in its central hole, and a disk portion 12b surrounding said hub portion 12a. A plurality of clutch disks 6 are each formed as a flat annulus rotationally coupled by a splined construction to the power input member 3 by its inside circular edge, and these clutch disks 6 are interleaved with a plurality of clutch plates 7 also formed as flat annuli and also all rotationally coupled by other splined constructions to the outer cylindrical portion 5a of the power output member 5 by their outside circular edges. An annular type piston member 9 is slidably fitted into the annular trench defined in the power output member 5 between the cylindrical portions 5b and 5c, and thus an annular hydraulic fluid pressure chamber 8 is defined between said piston member 9 and said power output member 5. When pressurized hydraulic fluid is supplied to said annular pressure chamber 8, the annular piston 9 is driven to the left in the figure against the biasing action of a compression coil spring 10, which is overcome, so that the piston 9 presses the superposed sandwich of the clutch disks 6 and the clutch plates 7 together, thus engaging the direct clutch 2 so as to transmit torque. This, in this transmission, causes the third speed stage. When no pressurized hydraulic fluid is supplied to said pressure chamber 8, the annular piston 9 is driven to the right in the figure by the compression coil spring 10, not to press the superposed sandwich of the clutch disks 6 and the clutch plates 7 together, which are accordingly left free to rotate with respect to one another, thus disengaging the direct clutch 2.

A radially extending hole 11 is formed through said inner cylindrical portion 5c of said power output member 5, with its outer end communicating to said pressure chamber 8, and with its inner end communicating to an annular groove 13a formed around the outer cylindrical surface of said hub portion 12a of said center support member 12. To this annular groove 13a there open the radially outer ends of two holes 13b and 41 formed as extending radially through said hub portion 12a, and the radially inner ends of these holes 13b and 41 open respectively to two longitudinally extending grooves 14 and 40 formed in the inner cylindrical surface of said hub portion 12a of said support member 12. The radially inner sides of these grooves are closed by an annular bearing element 50, and the right hand ends as viewed in FIG. 1 of these two grooves 14 and 40 open to the radially inner ends of two holes 15 and 39, respectively, which are formed in the disk portion 12b of the center support member 12 and extend substantially radially therein. The radially outer ends of these holes 15 and 39 are communicated to the radially inner ends of two holes 16 and 38 formed in the transmission casing 1, respectively; and the radially outer ends of these holes 16 and 38 are communicated to the one ends of two holes 18 and 37 respectively, said holes 18 and 37 being formed in a valve body 17 of the transmission control system which is securely fixed to said transmission casing 1.

A second friction engaging device 26, which is a brake which is engaged to brake the rotation of the power output member 5 when the second speed stage of the transmission is to be engaged, is also provided within the transmission casing 1, coaxially with the intermediate shaft 4 and the power input member 3. The brake 26 comprises an annular cylinder 51 formed in the center support member 12, an annular piston 52 slidably received in said annular cylinder 51 with an annular pressure chamber 42 being formed in said cylinder 51, a plurality of brake disks 53 each formed as a flat annulus and rotationally coupled by a spline construction to a cylindrical extrusion 12c of the center support member 12, and a plurality of brake disks 54 each formed as a flat annulus and rotationally coupled by a spline construction to the outer cylindrical portion 5a of the power output member 5. The pressure chamber 42 is selectively supplied with an actuating hydraulic fluid pressure or drained through a passage formed in the center support member 12 and a conduit means not shown in FIG. 1. The automatic transmission incorporating the clutch 2 and the brake 26 is caused to provide its second speed stage by the second speed stage brake 26 being engaged by actuating pressure being supplied to the pressure chamber 42, while the third speed stage direct clutch 2 is disengaged by actuating pressure not being supplied to the pressure chamber 8, while on the other hand said transmission is caused to provide its third speed stage by the second speed stage brake 26 being disengaged by no pressure being supplied to said pressure chamber 42 while the third speed stage direct clutch 2 is engaged by actuating pressure being supplied to said pressure chamber 8.

Figure 2:
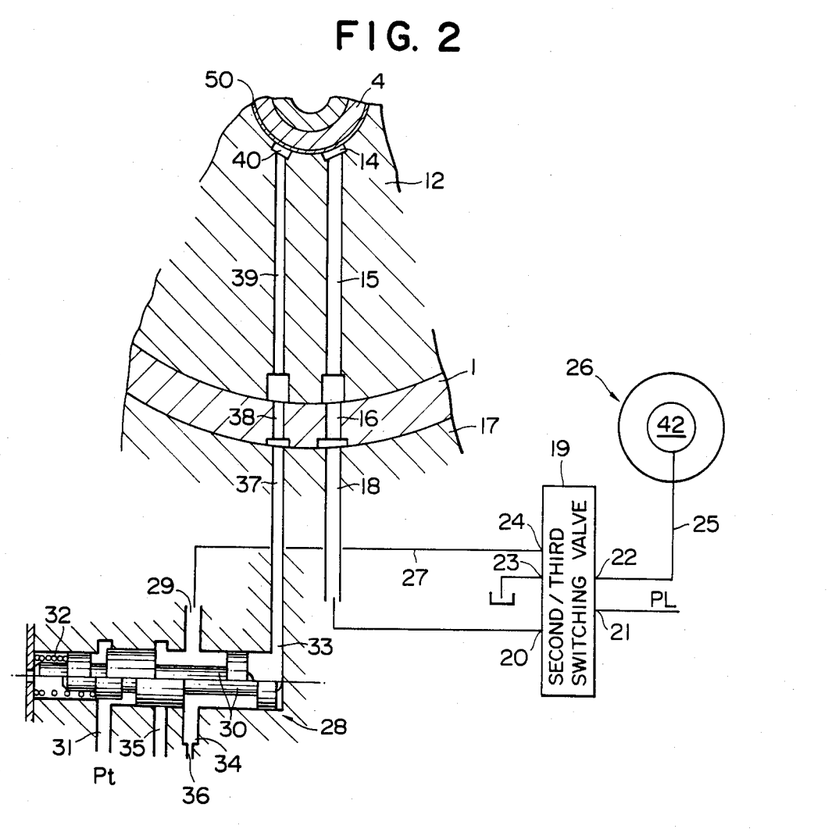
FIG. 2 is a combination view, showing a section of said transmission, taken in a plane indicated by the arrows II—II in FIG. 1, and also showing in schematic form an essential part of a first preferred embodiment of the hydraulic fluid pressure control system of the present invention, including a second/third shift valve and an upshift timing control valve.
Figure 3:
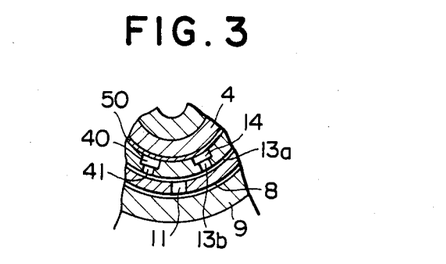
FIG. 3 is a sectional view of an inner portion of said transmission taken in a plane indicated by the arrows III—III in FIG. 1.

FIG. 2 also shows in block diagrammatical form a second/third shift valve 19, as well as schematically showing the second speed stage brake 26 and its pressure chamber 42. Selective supply of actuating hydraulic pressure to the pressure chambers 8 and 42 respectively of the clutch 2 and the brake 26 is performed by this second/third switching valve 19, which is a per se conventional spool type transmission valve comprising a body formed with a bore within which is mounted a valve element (not particularly shown) which can slide in said bore in the upward and downwards directions as viewed in the figure. A throttle pressure, which is produced by a per se well known throttle pressure control valve (not shown) by modifying a line pressure according to the amount of depression of a throttle pedal of the vehicle incorporating this transmission, is supplied to the second/third switching valve 19 so as to bias the valve element thereof in one axial direction with a force proportional to the magnitude of said throttle pressure and to the amount of said throttle depression; and, similarly, a governor pressure, which is produced by a per se well known governor pressure control valve (also no shown) by modifying said line pressure according to the current road speed of said vehicle, is also supplied to the second/third switching valve 19 so as to bias the valve element thereof in the other axial direction with a force proportional to the magnitude of said governor pressure and to the current road speed of said vehicle. Thereby, said valve element is shifted to its extreme position in said other axial direction when the governor pressure prevails over the throttle pressure, and on the other hand is shifted to its extreme position in said axial direction when the throttle pressure prevails over the governor pressure; this shifting action is per se well known and conventional.

When the valve element of the second/third switching valve 19 is in the state of being positioned to its extreme position in said axial direction with the throttle pressure prevailing over the governor pressure, then a port 21 which is continuously supplied with line pressure is communicated to a second speed stage port 22 which is connected via a hydraulic fluid conduit 25 to the pressure chamber 42 of the friction engaging device 26 (the second speed brake), while a third speed stage port 20 which is connected to the pressure chamber 8 of the friction engaging device 2 (the third speed stage clutch) is communicated to a port 23 which is drained directly; and accordingly said friction engaging device 26 is engaged by supply of actuating pressure to its pressure chamber 42, while said friction engaging device 2 is disengaged by draining of its pressure chamber 8, and thus the second speed stage of the transmission is engaged. On the other hand, when the valve element of the second/third switching valve 19 is in the state of being positioned to its extreme position in said other axial direction with the governor pressure prevailing over the throttle pressure, then the port 21 is communicated to the port 20, while the port 22 is communicated to a second speed stage controlled draining port 24 which as will be seen shortly is drained (in a controlled fashion) via an upshift timing control valve 28; and accordingly said friction engaging device 26 is disengaged by draining of its pressure chamber 42, while said friction engaging device 2 is engaged by supply of actuating hydraulic fluid pressure to its pressure chamber 8, and thus the third speed stage of the transmission is engaged.

In more detail, the third speed stage port 20 of the second/third switching valve 19 is connected to the pressure chamber 8 of the first friction engaging device 2 via the hydraulic fluid conduits 18, 16, and 15, the groove 14, the hole 13b, the groove 13a, and the hole 11. Further, the controlled drain port 24 of said valve 19 is connected to a port 29 of an upshift timing control valve 28 via a conduit 27. A control port 33 of this upshifting timing control valve 28 is connected to the pressure chamber 8 of the first friction engaging device 2 via the hydraulic fluid conduits 37, 38, and 39, the groove 40, the hole 41, the groove 13a, and the hole 11. Thus, the passage means via which the pressure chamber 8 of the first friction engaging device 2 is supplied with hydraulic fluid when actuation thereof is required, and via which said pressure chamber 8 is drained when actuation of said friction engaging device 2 is not required, is substantially completely distinct from the passage means by which the pressure value in said pressure chamber 8 is communicated to said upshift timing control valve 28 as a control pressure, and does not substantially overlap therewith (since the groove 13a and the hole 11 are of relatively trivial extent).

Now, the construction of the upshift timing subsystem comprising the upshift timing valve 28 will be explained. This upshift timing valve 28 is also a spool type transmission valve comprising a body formed with a bore within which is mounted a valve element 30 which can slide in said bore in the leftward and rightward directions as shown in FIG. 2, as shown on the upper and the lower side of the central axis of said valve 28 in the figure, respectively. The actuating pressure supplied to the pressure chamber 8 of the friction engaging device 2 is also supplied to a port 33 of the upshift timing valve 28 so as to bias the valve element 30 in the leftward direction in the figure with a force proportional to the magnitude of said actuating pressure; and a compression coil spring 32 biases the valve element 30 in the rightward direction in the figure with a substantially constant force. Further, another biasing force is supplied to the valve element 30 proportional to the magnitude of the throttle pressure, by said throttle pressure being supplied to a port 31 which opens between two lands of said valve element 30 which are of different diameters though this is not directly relevant to the present invention. Thus said valve element 30 is shifted to its rightward position in the figure, when the sum of the force of said spring 32 and the force due to said throttle pressure being supplied to the port 31 prevails over the force exerted by the pressure supplied to the port 33 which is the actuating pressure for the friction engaging device 2, i.e. when said actuating pressure for the friction engaging device 2 is less than some certain threshold value (which actually depends on the current value of the throttle pressure), and on the other hand is shifted to its leftward position in the figure, when the force exerted by said actuating pressure for the friction engaging device 2 prevails over said sum of the force of said spring 32 and the force due to said throttle pressure, i.e. when said actuating pressure for the friction engaging device 2 is greater than said certain threshold value.

When the valve element 30 of the upshift timing valve 28 is shifted to its rightward position as seen in the figure, the port 29 thereof is communicated to a port 34, while a port 35 thereof is communicated to no other port. The port 34 is connected to a drain via a throttling element 36; and the port 35 is connected directly to a drain with no substantial fluid resistance being interposed. Accordingly in this operational condition the port 29 is communicated to a drain via the throttling element 36, thus with a certain relatively high flow resistance. On the other hand, when the valve element 30 is shifted to its leftward position as viewed in the figure, the port 29 is communicated to both the port 34 and the port 35; and accordingly in this operational condition the port 29 is communicated to drain substantially directly, thus with a certain relatively low flow resistance. The aforesaid port 29 of the upshift timing valve 28 is as specified above connected through the conduits 27 and 25 to the pressure chamber 42 of the second speed brake 26 when the second/third switching valve 19 is shifted up so as to drain the pressure chamber 42. This means that the pressure chamber 42 of the second speed brake 26 is connected to a drain first with a high flow resistance but with a low flow resistance when the actuating pressure for the friction engaging device 2 is greater than said threshold value. And, particularly according to the present invention, the control pressure for the upshift timing control valve 28 corresponding to the actuating pressure for the friction engaging device 2 is supplied directly from the pressure chamber 8 of said friction engaging device 2. In other words, the control pressure passage means for the upshift timing control valve 28 does not branch off from an intermediate portion of the actuating pressure supply passage means for the friction engaging device 2 as was the case in the prior art, but instead leads from said pressure chamber 8 of said friction engaging device 2 to said valve 28.

Figure 4:
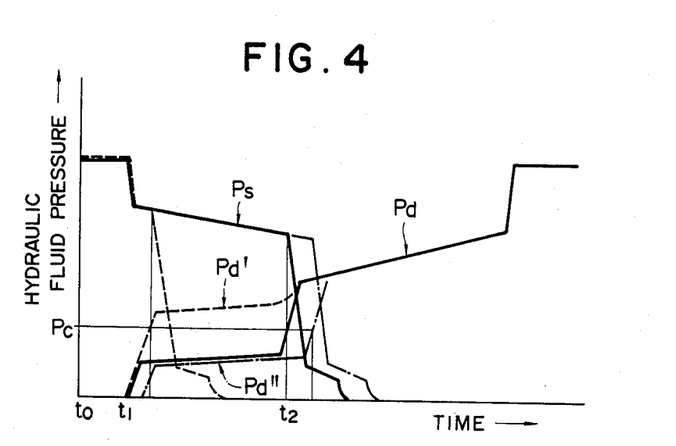
FIG. 4 is a time chart, showing time elapsed from the instant of initiating an upshift along the horizontal axis, and showing along the vertical axis the behavior with respect to time of the actuating hydraulic fluid pressures of two friction engaging devices with respect to a desirable case available by the present invention and in comparison with undesirable prior art cases.

Now, the upshifting operation from the second speed stage to the third speed stage of the preferred embodiment of the hydraulic fluid pressure control system for an automatic transmission according to the present invention will be explained, with particular reference to the time charts shown in FIGS. 4 through 6. In these time charts, time elapsed from the instant of initiating upshifting is shown along the horizontal axis, and elapsed time corresponds in the three time charts. FIG. 4 shows the behavior with respect to time of the actuating pressures supplied to the friction engaging devices 2 and 26, which is substantially the same as the control pressure supplied to the control port of the upshift timing valve according to the present invention, with the control pressure supplied to the control port of the upshift timing valve in a prior art case in which the hydraulic fluid for the transmission has a high viscosity, as in the case that it is cold. Further, FIG. 5 shows the concurrent behavior with respect to time in both said cases of the torque transmitted by the transmission between its power input member 3 and its power output member 5; and FIG. 6 shows the concurrent behavior with respect to time in both said cases of the revolution speed of the engine of the vehicle.

First, when the transmission of the vehicle is set to and is functioning in the second speed stage, the valve element of the second/third switching valve 19 is positioned with the throttle pressure prevailing in its biasing effect thereon, and accordingly line pressure is being supplied from the port 21 thereof to the port 22 which is connected to the pressure chamber 42 of the friction engaging device 26 (the second speed brake) via the conduit 25, and accordingly said friction engaging device 26 is engaged; and further the port 20 of the second/third switching valve 19 is communicated to the port 23 which is directly drained, and so the pressure chamber 8 of the friction engaging device 2 (the third speed clutch) is communicated to drain via the second/third switching valve 19, and accordingly said friction engaging device 2 is disengaged. At this time the hydraulic pressure in the conduit 37 is substantially zero, and accordingly the valve element 30 of the upshift timing valve 28 is in its rightward position as viewed in FIG. 2 with the port 29 thereof only communicated to the port 34 and not to the port 35.

Figure 5:
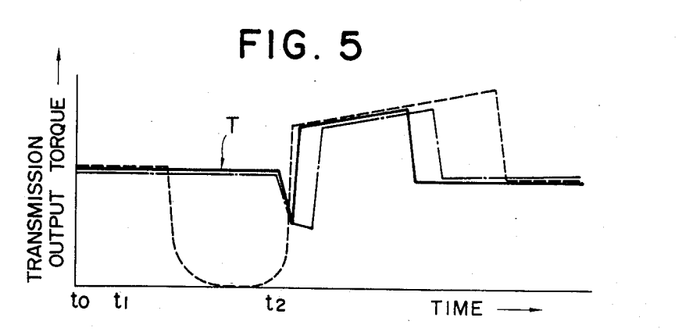
FIG. 5 is another time chart, showing time along the horizontal axis concurrently to FIG. 4, and showing the behavior with respect to time of the torque supplied to a power output member along the vertical axis, corresponding to the three cases shown in in FIG. 4.
Figure 6:
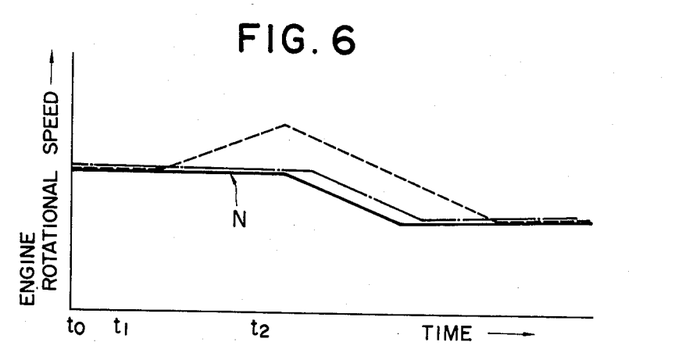
FIG. 6 is another time chart, showing time along the horizontal axis concurrently to FIGS. 4 and 5, and showing the behavior with respect to time of the revolution speed of an engine and a power input member along the vertical axis, corresponding to the three cases shown in FIGS. 4 and 6.

Now, suppose that at a time point corresponding to the origin in FIGS. 4 through 6, i.e. at the time point $t_0$, the relationship between the throttle pressure and the governor pressure as they act on the valve element of the second/third switching valve 19 shifts by the alteration of either or both of them, so that the governor pressure now prevails over the throttle pressure. In this case, the valve element will shift to its other extreme position, and accordingly now the port 21 of the second/third switching valve 19 will become connected to the port 20, while the port 22 will become connected to the port 24. This shift of the valve element initiates the upshifting process. The communication of the port 21 to the port 20 means that a flow of hydraulic fluid starts to be supplied from the port 20 through, in order, the conduits 18, 16 and 15, the groove 14, the hole 13b, the groove 13a, and the hole 11 to the pressure chamber 8 of the friction engaging device 2, and accordingly the value of the pressure in this pressure chamber 8 starts progressively to rise, thus progressively engaging the friction engaging device 2 gradually by pushing the piston 19 to the left in FIG. 1 against the spring force of the compression coil spring 10, at an engagement rate determined by the effective flow resistance of said hydraulic fluid path. The solid line designated by the symbol "Pd" in FIG. 4 shows the behavior with respect to time of the pressure in the pressure chamber 8 of the friction engaging device 2 which is being engaged: after a certain initial lag up to a time point $t_1$, this pressure starts to rise, and thereafter it rises until it comes to be effectively equal to line pressure.

First, in the first stage of this upshifting process, with the port 22 of the second/third switching valve 19 communicated to the port 24 thereof, the pressure chamber 42 of the friction engaging device 26 is communicated to drain via the conduit 25, the second/third switching valve 19, the conduit 27, the port 29 of the upshift timing valve 28, the port 34 thereof only, and the throttling element 36. This draining is therefore accomplished at a relatively low rate, determined by the effective flow resistance of said throttling element 36. This ensures that the friction engaging device 26, in this first stage of upshifting, is kept able to transmit a quite sufficient amount of torque, until the pressure in the pressure chamber 8 of the second friction engaging device 2 rises to said certain threshold value designated by $P_c$ in FIG. 4, at the time point $t_2$. The solid line designated by the symbol "Ps" in FIG. 4 shows the behavior with respect to time of the pressure in the pressure chamber 42 of the friction engaging device 26 which is being disengaged: after a certain initial lag up to approximately the time point $t_1$, this pressure Ps starts to fall at said fairly low rate, as indicated by the fairly small negative gradient of said line up to the time point $t_2$. And the solid line designated by the symbol "T" in FIG. 5 shows the behavior with respect to time of the torque transmitted by the friction engaging device 26 during this time period, which, since the friction engaging device 26 is being relatively slowly drained until the time point $t_2$, is substantially equal to the maximum torque ever transmitted thereby at this time.

When, however, said pressure Pd being supplied to the pressure chamber 8 of the friction engaging device 2 rises up to said threshold value $P_c$, i.e. at the time point $t_2$ in FIG. 4, which is a pressure value at which said second friction engaging device 2 is engaged to some considerable extent and is capable of good torque transmission, then under the biasing effect of this pressure which is transmitted from the pressure chamber 8 via, in order, the hole 11, the groove 13a, the hole 41, the groove 40, the conduits 39, 38, and 37 to the port 33, the valve element 30 of the upshift timing valve 28 shifts to its leftward position as viewed in FIG. 2, and the port 29 of said upshift timing valve 28 becomes communicated to the port 35 as well as to the port 34. As a result, the pressure chamber 42 of the friction engaging device 26 at this time point $t_2$ becomes communicated, directly to drain through the port 35, with no throttling effect being provided by any throttling element and accordingly with a relatively low flow resistance. This draining therefore after the time point $t_2$ progresses at a relatively high speed as indicated by the fairly large negative gradient of the part of the solid line "Ps" in FIG. 4 relating thereto, and accordingly in this second stage of upshifting the pressure chamber 42 of the friction engaging device 26 is quickly drained to a substantially zero pressure, thus quickly disengaging said friction engaging device 26. At this time, as indicated by the solid line designated by the symbol "T" in FIG. 5, the torque transmitted by the transmission does not drop much, because already the friction engaging device 2 is able to transmit torque fairly well; and accordingly transmission slippage is avoided. Accordingly, as indicated by the solid line designated by the symbol "N" in FIG. 6, the revolution speed of the engine powering the transmission does not increase much at this time; and accordingly engine racing is avoided. Further, since from when the friction engaging device 2 has become engaged to the aforesaid certain engagement condition at which the pressure in its pressure chamber 8 comes to be equal to $P_c$ onward the friction engaging device 26 is quickly disengaged, it is particularly avoided that any attempt should be made to substantially engage both the first friction engaging device 26 and the second friction engaging device 2 at the same time, and accordingly the poor drivability and the heavy wearing of the friction engaging devices which would likely be attendant on such double engagement are positively avoided.

It should be noted that the upshift timing valve 28 is arranged to shift leftward in FIG. 2 when, in fact, a lesser pressure value than the pressure value $P_c$ is supplied to its port 33; this is to compensate for the attenuation of the pressure transmitted from the pressure chamber 8 to the port 33, due to the flow resistance of the conduit therebetween. Therefore, the characteristics of the compression coil spring 32 and so on are so chosen, during design of this transmission control system, as to ensure that the valve 28 shifts over, at approximately the time point $t_2$ when the pressure in the pressure chamber 8 rises past the pressure value $P_c$.

Now, in the event that the hydraulic fluid in the transmission in fact is cold, so that its viscosity is substantially increased, then in the prior art, in which the supply of hydraulic fluid for an upshift timing control valve such as the valve 28 was typically made through a sampling passage from an intermediate point of the passage from the shift valve (corresponding to the valve 19 of FIG. 2) to the pressure chamber of the friction engaging device (corresponding to the friction engaging device 2 of FIG. 2), there was a likelihood that this pressure supplied to the control port of the upshift timing control valve could, as schematically shown by the dashed line denoted by the symbol "Pd'" in FIG. 4, actually be greater than the pressure supplied to the pressure chamber of the friction engaging device to engage it due to a large flow resistance of the abovementioned passage applied to a low temperature and relatively viscous hydraulic fluid. In such a case, the first friction engaging device 26 would start to be disengaged quickly, as indicated by the dashed line denoted by the symbol "Ps'" in FIG. 4, before the second friction engaging device 2 was properly able to transmit torque; and accordingly, as indicated by the dashed line in FIG. 5, the torque transmitted by the transmission drops almost to zero at this time. Further, as indicated by the dashed line in FIG. 6, the revolution speed of the engine driving the transmission is allowed to rise very substantially; i.e., the engine races.

Such a defect is avoided according to the present invention, because according to the present invention the pressure in the pressure chamber 8 of the friction engaging device 2 is supplied to the upshift timing control valve 28 as a control pressure. Therefore always it is positively guaranteed that the pressure supplied as a control pressure to the upshift timing control valve is definitely lower than the pressure in said pressure chamber.

Figure 7:
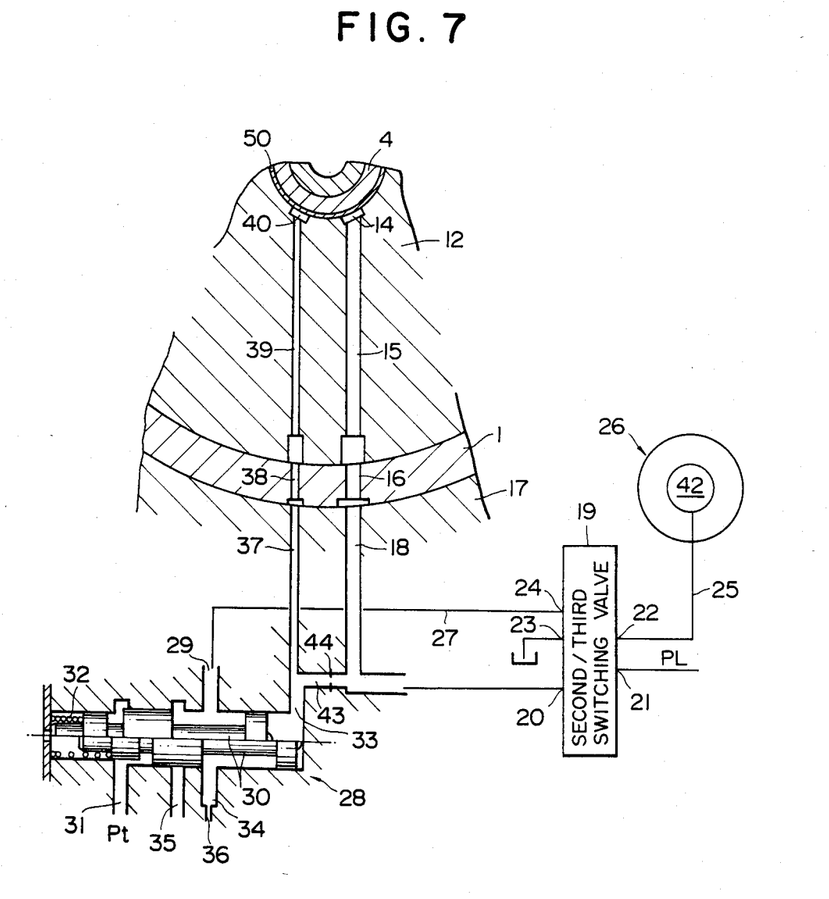
FIG. 7 is a view similar to FIG. 2, but relates to a second embodiment of the hydraulic fluid pressure control device of the present invention, in which an additional hydraulic fluid conduit with a throttle is provided for supplying additional control pressure to said upshift timing control valve.

In FIG. 7, which is a view similar to FIG. 2 a modification to the embodiment shown in FIG. 2 is shown.

In this second modified embodiment, an additional hydraulic fluid conduit 43 with a throttling element 44 therealong is provided between the hydraulic fluid conduit 18 and the hydraulic fluid conduit 37. In more detail, from a certain first point on the hydraulic fluid conduit system leading from and close to the shift valve 19 to the pressure chamber 8 of the friction engaging device 2 for supplying actuating hydraulic fluid pressure to said pressure chamber 8, to a certain second point on the hydraulic fluid conduit system leading from and remote from said pressure chamber 8 to the control port 33 of the upshift timing control valve 28 for supplying control hydraulic fluid pressure to said control port, there is provided said hydraulic fluid conduit 43 with said throttling element 44 therein, said throttling element 44 having a quite high flow resistance; Thus, a certain quite small flow from the hydraulic fluid conduit 18 flows via the hydraulic fluid conduit 43 and the throttling element 44 flows directly into the hydraulic fluid conduit 37. If the throttling amount of the throttling element 44 is properly chosen, this additional flow is never so great as to cause premature disengagement of the friction engaging device 26 due to premature quick draining thereof due to premature shifting of the valve 28. The reason for providing this extra control pressure is in order to keep any air that may become introduced into the hydraulic fluid conduits 37, 38, and 39, the groove 40, etc., either expelled by generating a gradual circulation of fluid through the conduits 37, 38, and 39, the groove 40, etc.. Thereby, bad effects such as timing delay in transmission of control hydraulic fluid pressure from the pressure chamber 8 to the port 33 that could be caused by such entrained air, the occurrence of which is inevitable in the operation of any transmission control device, are avoided. In fact, by proper tailoring of the size of the orifice of the throttling element 44, it is possible to so arrange the parameters of the system, that the control pressure supplied to the port 33 of the upshift timingn control valve 28 is substantially equal to the actuating pressure supplied to the pressure chamber 8 of the friction engaging device 2. By this modification, it is advantageously avoided that, as shown by the dotted line denoted by "Ps'''" in FIG. 4, the shifting of the valve element 30 of the upshift timing control valve 28 leftward in FIG. 2 is delayed owing to entrapped air in the system, and the friction engaging device 26 is being disengaged too slowly after the friction engaging device 2 is engaged enough to be properly ready to transmit torque. The dotted lines in FIGS. 5 and 6 show the behavior of the torque transmitted by the transmission and the revolution speed of the engine in such a case. If such an undesirable situation should happen, then the friction engaging device 2 would be severely and quickly worn. However, the provision of the conduit 43 and the throttling element 44 guards against this eventuality.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. In an automatic transmission, for a gear transmission mechanism comprising first and second hydraulic pressure actuated friction engaging devices which comprise respective first and second pressure chambers, said gear transmission mechanism providing a certain lower speed stage when said first friction engaging device is engaged by supply of actuating hydraulic fluid pressure to said first pressure chamber and said second friction engaging device is disengaged by non-supply of actuating hydraulic fluid pressure to said second pressure chamber, and a certain higher speed stage one speed stage above said certain lower speed stage when said first friction engaging device is disengaged by non-supply of actuating hydraulic fluid pressure to said first pressure chamber and said second friction engaging device is engaged by supply of actuating hydraulic fluid pressure to said second pressure chamber, said second pressure chamber having a hole for passage of hydraulic fluid, a hydraulic fluid pressure control system, comprising:
(a) an upshift timing control means comprising a valve element, a control port subject to a pressure which controls shifting of said valve element, and a control passage whose flow resistance changes according to the shifting of said valve element, said control passage providing a relatively high flow resistance when the pressure supplied to said control port is less than a certain value and a relatively low flow resistance when the pressure supplied to said control port is greater than said certain value;
(b) a source of line hydraulic fluid pressure;
(c) a first hydraulic fluid conduit system having one end connected to said hole of said second pressure chamber;
(d) a second hydraulic fluid conduit system, communicating said hole of said second pressure chamber of said second friction engaging device to said control port of said upshift timing control means and being separate from said first conduit system;
(e) a shift valve which is selectively positioned either to:
(e1) a first position, in which it connects said source of line hydraulic fluid pressure to said first pressure chamber of said first friction engaging device, and in which it connects said hole of said second pressure chamber of said second friction engaging device to a drain via said first hydraulic fluid conduit system;
or to:
(e2) a second position, in which it connects said source of line hydraulic fluid pressure to said hole of said second pressure chamber of said second friction engaging device via said first hydraulic fluid conduit system, and in which it connects said first pressure chamber of said first friction engaging device to a drain via said control passage of said upshift timing control means;
wherein said second hydraulic fluid conduit system consists substantially only of a conduit leading from said hole of said second pressure chamber of said second friction engaging device to said control port of said upshift timing control means.

2. A hydraulic fuid pressure control system according to claim 1 including a stationary center support member supporting said first and second friction engaging devices, at least portions of which are rotatable relative thereto, wherein said first and second hydraulic fluid conduit systems include holes in said support member.

3. In an automatic transmission, for a gear transmission mechanism comprising first and second hydraulic pressure actuated friction engaging devices which comprise respective first and second pressure chambers, said gear transmission mechanism providing a certain lower speed stage when said first friction engaging device is engaged by supply of actuating hydraulic fluid pressure to said first pressure chamber and said second friction engaging device is disengaged by non-supply of actuating hydraulic fluid pressure to said second pressure chamber, and a certain higher speed stage one speed stage above said certain lower speed stage when said first friction engaging device is disengaged by non-supply of actuating hydraulic fluid pressure to said first pressure chamber and said second friction engaging device is engaged by supply of actuating hydraulic fluid pressure to said second pressure chamber, said second pressure chamber having a hole for passage of hydraulic fluid, a hydraulic fluid pressure control system, comprising:
(a) an upshift timing control means comprising a valve element, a control port subject to a pressure which controls shifting of said valve element, and a control passage whose flow resistance changes according to the shifting of said valve element, said control passage providing a relatively high flow resistance when the pressure supplied to said control port is less than a certain value and a relatively low flow resistance when the pressure supplied to said control port is greater than said certain value;
(b) a source of line hydraulic fluid pressure;
(c) a first hydraulic fluid conduit system having one end connected to said hole of said second pressure chamber;
(d) a second hydraulic fluid conduit system, communicating said hole of said second pressure chamber of said second friction engaging device to said control port of said upshift timing control means and being separate from said first conduit system;
(e) a shift valve which is selectively positioned either to:
(e1) a first position, in which it connects said source of line hydraulic fluid pressure to said first pressure chamber of said first friction engaging device, and in which it connects said hole of said second pressure chamber of said second friction engaging device to a drain via said first hydraulic fluid conduit system;

or to:
(e2) a second position, in which it connects said source of line hydraulic fluid pressure to said hole of said second pressure chamber of said second friction engaging device via said first hydraulic fluid conduit system, and in which it connects said first pressure chamber of said first friction engaging device to a drain via said control passage of said upshift timing control means, wherein said second hydraulic fluid conduit system consists substantially of a main conduit leading from said hole of said second pressure chamber of said second friction engaging device to said control port of said upshift timing control means, a supplementary conduit leading from an intermediate part of said main conduit to an intermediate part of said first hydraulic fluid conduit system, and a throttling element provided in said supplementary conduit so as to increase flow resistance thereof to be substantially greater than the flow resistance of said main conduit.

4. A hydraulic fuid pressure control system according to claim 3 including a stationary center support member supporting said first and second friction engaging devices, at least portions of which are rotatable relative thereto, wherein said first and second hydraulic fluid conduit systems include holes in said support member.

5. A hydraulic fluid pressure control system according to claim 3, wherein the part in said first hydraulic fluid conduit system to which said supplementary conduit is joined is substantially closer to said shift valve than to said hole of said second pressure chamber of said second friction engaging device.

6. A hydraulic fluid pressure control system according to claim 3, wherein the flow resistance of said first hydraulic fluid conduit system from said part therein to which said supplementary conduit is joined to said shift valve is substantially less than the flow resistance of said first hydraulic fluid conduit system from said part therein to which said supplementary conduit is joined to said second pressure chamber of said second friction engaging device.

* * * * *